US012256220B2

(12) United States Patent
Singh et al.

(10) Patent No.: US 12,256,220 B2
(45) Date of Patent: Mar. 18, 2025

(54) ADAPTIVE SECURITY LEVEL OF WIRELESS SENSORS

(71) Applicant: Schneider Electric Industries SAS, Rueil Malmaison (FR)

(72) Inventors: Ashwani Singh, L'Isle d'Espagnac (FR); Loïc Caseras-Noale, Dirac (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 348 days.

(21) Appl. No.: 17/826,457

(22) Filed: May 27, 2022

(65) Prior Publication Data
US 2022/0394479 A1 Dec. 8, 2022

(30) Foreign Application Priority Data

Jun. 4, 2021 (EP) .................................. 21305754

(51) Int. Cl.
*H04W 12/122* (2021.01)
*G06F 30/27* (2020.01)
(52) U.S. Cl.
CPC .......... *H04W 12/122* (2021.01); *G06F 30/27* (2020.01)
(58) Field of Classification Search
CPC ............................ H04W 12/122; G06F 30/27
See application file for complete search history.

(56) References Cited

U.S. PATENT DOCUMENTS

| 11,323,884 B2* | 5/2022 | Lifshitz | G06N 20/20 |
| 11,374,835 B2* | 6/2022 | Sivaraman | H04L 47/115 |
| 11,652,827 B2* | 5/2023 | Overby | H04L 63/14 |
| | | | 726/23 |
| 11,659,396 B2* | 5/2023 | Shaw | H04W 12/12 |
| | | | 455/410 |

(Continued)

FOREIGN PATENT DOCUMENTS

WO 2018004580 A1 1/2018

OTHER PUBLICATIONS

European Search Report and Search Opinion dated Nov. 12, 2021 for European Patent Application No. EP21305754.0-1213, 9 pages.

*Primary Examiner* — Venkat Perungavoor
*Assistant Examiner* — Peiliang Pan
(74) *Attorney, Agent, or Firm* — Troutman Pepper Locke LLP

(57) ABSTRACT

A method for setting a security level of wireless sensors communicating with a switch. The method includes in a security device linked to the switch: collecting data frames sent from the wireless sensors to the switch and creating a dataset containing the collected data frames; identifying patterns associated with the wireless sensors from the collected data frames; introducing simulated traffic anomalies in the dataset with respect to the traffic patterns; randomizing the dataset and dividing the randomized dataset into a training dataset and a testing dataset; training, using the training dataset, a machine learning model configured for detecting traffic anomalies, and validating the machine (Continued)

learning model; detecting a traffic anomaly for a wireless sensor by analyzing current data frames and using the validated machine learning model; triggering a security alert based on the detected traffic anomaly; and adapting a security level for the wireless sensor based on the security alert.

11 Claims, 2 Drawing Sheets

(56) References Cited

U.S. PATENT DOCUMENTS

| | | | |
|---|---|---|---|
| 11,696,138 B2 * | 7/2023 | Munteanu | H04W 12/61 |
| | | | 380/270 |
| 11,968,537 B2 * | 4/2024 | Sharma | H04W 12/122 |
| 2017/0214702 A1 * | 7/2017 | Moscovici | H04W 12/106 |
| 2019/0387399 A1 * | 12/2019 | Weinberg | H04L 43/04 |
| 2021/0133607 A1 * | 5/2021 | Stubbs | G06N 20/00 |
| 2022/0330027 A1 * | 10/2022 | Djukic | H04W 12/122 |
| 2023/0342456 A1 * | 10/2023 | Ansari | G06F 21/602 |

* cited by examiner

ADAPTIVE SECURITY LEVEL OF WIRELESS SENSORS

FIELD OF INVENTION

The present invention generally relates to industrial automation system, and more particularly relates to security level of wireless sensors of the industrial automation system.

BACKGROUND

The Internet of Things (IoT) is an essential element of the digital development of companies. On many markets, connected objects capture valuable information. Industrial IoT devices are mainly sensors linked to machines that are located in different industrial sites and measure, record, and send operating data to a data center to be analyzed. These sensors are mainly wireless devices that are powered by an internal battery.

When new wireless sensors are added to a network of an industrial automation system, they are commissioned with high level of cyber security protection, whatever the real threat existing in the network. Using high level of cyber security protection may induce a drain of the battery of the wireless sensors.

There is therefore a need for adapting the level of cyber security of wireless sensors of an industrial automation system.

SUMMARY

This summary is provided to introduce concepts related to the present inventive subject matter. This summary is not intended to identify essential features of the claimed subject matter nor is it intended for use in determining or limiting the scope of the claimed subject matter.

In one implementation, there is provided a method for setting a security level of wireless sensors communicating with a switch, the method comprising the following steps in a security device linked to the switch:
collecting data frames sent from the wireless sensors to the switch and creating a dataset containing the collected data frames,
identifying patterns associated with the wireless sensors from the collected data frames, each pattern being based on a periodic time interval for sending two consecutive data frames by a wireless sensor or based on a number of data frames sent by a wireless sensor during a time interval of usage,
introducing simulated traffic anomalies in the dataset with respect to the traffic patterns,
randomizing the dataset and dividing the randomized dataset in a training dataset and in a testing dataset, wherein the training dataset contains more data frames than the testing dataset,
training, by using the training dataset, a machine learning model configured for detecting traffic anomalies, and validating the machine learning model if the trained machine learning model reaches a threshold of accuracy with the testing dataset,
detecting a traffic anomaly for a given wireless sensor during operation of the wireless sensors by analyzing current data frames sent from the wireless sensors to the switch and by using the validated machine learning model,
triggering a security alert based on the detected traffic anomaly,
adapting a security level for at least the given wireless sensor based on the triggered security alert.

Advantageously, the method allows to commission the power constraint of wireless sensors in an industrial network with right security level based on the risk assessment of existing network, instead of classic approach of commissioning the wireless sensors with highest level of cyber security protection which significantly reduces the lifetime of battery powering the wireless sensors.

In an embodiment, the wireless sensors are supplied by internal battery.

Advantageously, the adaptive security for wireless sensor based on machine learning for traffic anomaly detection allows having a longer battery life for these wireless sensors, hence reduced cost of maintenance.

In an embodiment, a traffic anomaly for a given wireless sensor corresponds to a frequency or number of data frames sent by the wireless sensor higher than the traffic pattern associated with said given wireless sensor.

In an embodiment, a pattern associated with a wireless sensor is based on a periodic time interval for sending two consecutive data frames by the wireless sensor when said wireless sensor is a periodic wireless sensor sending operating data at periodic time intervals.

In an embodiment, a pattern associated with a wireless sensor is based on a number of data frames sent by a wireless sensor during a time interval of usage when said wireless sensor is an aperiodic wireless sensor sending operating data upon events.

In an embodiment, the security level is adapted for wireless sensors of the same type as the given wireless sensor or for all the wireless sensors based on the triggered security alert.

In an embodiment, a traffic anomaly is detected for a given wireless sensor when a data frame sent by the given wireless sensor corresponds to an increase of traffic with respect to the pattern associated with the given wireless sensor.

In an embodiment, the machine learning model is based on a supervised random forest model.

In another implementation, there is provided a device for setting a security level of wireless sensors communicating with a switch, the security device being linked to the switch and comprising:
means for collecting data frames sent from the wireless sensors to the switch and creating a dataset containing the collected data frames,
means for identifying patterns associated with the wireless sensors from the collected data frames, each pattern being based on a periodic time interval for sending two consecutive data frames by a wireless sensor or based on a number of data frames sent by a wireless sensor during a time interval of usage,
means for introducing simulated traffic anomalies in the dataset with respect to the traffic patterns,
means for randomizing the dataset and dividing the randomized dataset in a training dataset and in a testing dataset, wherein the training dataset contains more data frames than the testing dataset,
means for training, by using the training dataset, a machine learning model configured for detecting traffic anomalies, and validating the machine learning model if the trained machine learning model reaches a threshold of accuracy with the testing dataset,
means for detecting a traffic anomaly for a given wireless sensor during operation of the wireless sensors by analyzing current data frames sent from the wireless sensors to the switch and by using the validated machine learning model, means for triggering a security alert based on the detected traffic anomaly, means for adapting a security level for at least the given wireless sensor based on the triggered security alert.

In another implementation, there is provided an apparatus for setting a security level of wireless sensors communicating with a switch, the apparatus being linked to the switch and comprising:

one or more network interfaces to communicate with a telecommunication network;

a processor coupled to the network interfaces and configured to execute one or more processes; and a memory configured to store a process executable by the processor, the process when executed operable to:

collect data frames sent from the wireless sensors to the switch and creating a dataset containing the collected data frames, identify patterns associated with the wireless sensors from the collected data frames, each pattern being based on a periodic time interval for sending two consecutive data frames by a wireless sensor or based on a number of data frames sent by a wireless sensor during a time interval of usage, introduce simulated traffic anomalies in the dataset with respect to the traffic patterns, randomize the dataset and dividing the randomized dataset in a training dataset and in a testing dataset, wherein the training dataset contains more data frames than the testing dataset, train, by using the training dataset, a machine learning model configured for detecting traffic anomalies, and validating the machine learning model if the trained machine learning model reaches a threshold of accuracy with the testing dataset, detect a traffic anomaly for a given wireless sensor during operation of the wireless sensors by analyzing current data frames sent from the wireless sensors to the switch and by using the validated machine learning model, trigger a security alert based on the detected traffic anomaly, adapt a security level for at least the given wireless sensor based on the triggered security alert.

In another implementation there is provided a computer-readable medium having embodied thereon a computer program for executing a method for setting a security level of wireless sensors communicating with a switch. Said computer program comprises instructions which carry out steps according to the method according to the invention.

BRIEF DESCRIPTION OF THE FIGURES

The detailed description is described with reference to the accompanying figures. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

The same reference number represents the same element or the same type of element on all drawings.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
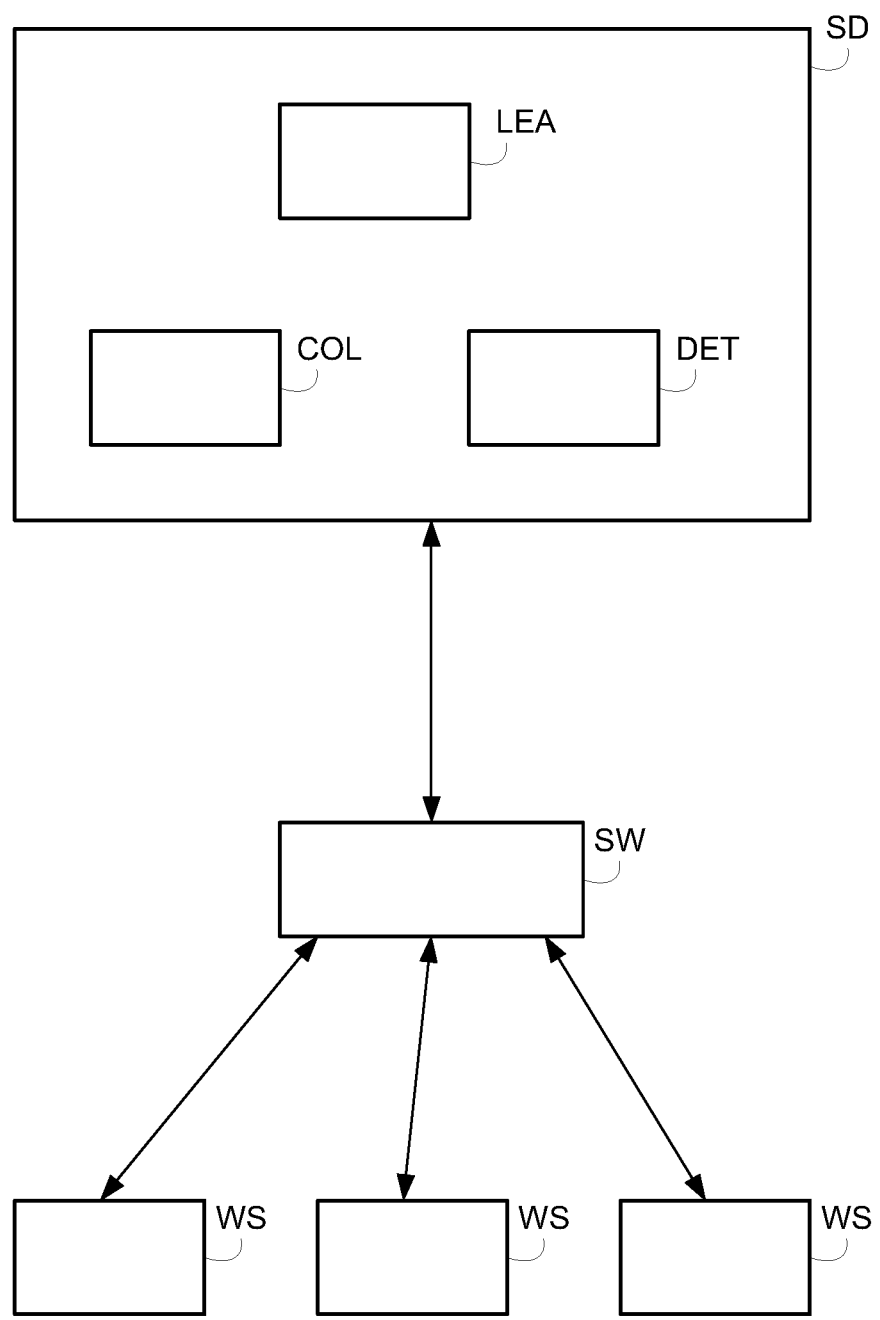
FIG. 1 shows a schematic block diagram of a communication system according to one embodiment of the invention for adapting the level of security of wireless sensors.

Referring to FIG. 1, a communication system comprises a security device SD, a switch SW and a set of wireless sensors WS, wherein the security device SD is connected to the switch and the switch is able to communicate through a telecommunication network TN with the set of wireless sensors WS.

The switch SW can be connected to the communication devices through wireless link, for example based on as Zigbee or Zigbee Green Power or Bluetooth low energy or other short range technologies. In another example, the switch is part of a telecommunication network that is a public wireless network of limited scope, such as WLAN (Wireless Local Area Network) or conforming to a standard 802.1x, or medium range according to the protocol WiMAX (World Wide Interoperability Microwave Access.

Additionally, the telecommunication network may be operating in accordance with fourth or fifth generation wireless communication protocols and/or the like as well as similar wireless communication protocols that may be developed in the future.

The wireless sensors WS are powered by an internal battery and are able to measure and send operating data to a data center to be analyzed. The wireless sensors WS send the operating data to the data center through the telecommunication network and via the switch SW.

The wireless sensors WS may be any type of sensor, such as a pressure sensor, fluid level detector, electrical current/voltage meter, pH-meter, leakage/strain detector, incident or occurrence counter, or velocity/acceleration meter. Thus, any sensor capable of measuring a particular sensor value may be connected to the switch SW.

Furthermore, the wireless sensors WS may can be sensors able to measure temperature, humidity and temperature, or energy measurement etc.

The wireless sensors WS can be configured with different predefined security levels. For example, a low security level provides a minimum of cyber protection by activating only the minimum cryptographic elements required by the service associated with the wireless sensor. For example, a medium security level provides an average cyber protection by activating more cryptographic elements. For example, a high security level provides a maximum of cyber protection by activating all the cryptographic elements. Different security levels can be set, for example depending on the cryptographic elements activated, or the level of strength of a cryptographic algorithm.

It is assumed that the higher security level corresponds to a situation that consumes the most power to use the related cryptographic elements. On the contrary, the lower security level corresponds to a situation that consumes the less power to use the related cryptographic elements.

The switch SW is a wireless hub that is paired with wireless sensors WS. When a switch is paired with a wireless sensor WS, the gateway allocates a dedicated channel for communication with the wireless sensor. The dedicated channel reserves memory zones for storing operating data coming from the wireless sensor.

The switch SW contains a memory for storing operating data in an organized manner, by reserving addresses of memory for specific wireless sensors. For example, when the switch receives a data frame from a wireless sensor, the switch extracts an identifier of the wireless sensor and stores the operating data of the frame a memory zone corresponding to an address associated with the identifier of the wireless sensor. The switch SW can store also a table of correspondence listing for each wireless sensor the identifier of the wireless sensor in association with the type of the wireless sensor and the position of the wireless sensor data in the switch memory.

The security device SD is able to analyse the content of operating data sent by the wireless sensors and retrieved by the switch SW. The security device SD is linked to the switch SW. In one embodiment, the security device SD is an entity external to the switch and can communicate directly with it, or security device SD is integrated in the switch.

The security device SD includes a collector module COL, a learning module LEA and a detection module DET.

The collector module COL collects traffic information relating to exchanges between the wireless sensors and the switch. The collector module COL creates a log file for all the data frame sent out by the wireless sensors. The log file contains a timestamp for each data frame sent by the wireless sensors.

When the sensor is a periodic sensor, i.e. a sensor sending operating data at periodic time interval, the collector module COL can compute a measured period P by performing an on-the-fly calculation of a difference between the timestamps of two consecutive frames received by the switch: P=TimestampFrame(n)−TimestampFrame(n−1). In another embodiment, the periodic time interval is already known by the security device SD.

The collector module COL determines a minimum time between two consecutive frames from the same communication device, said minimum time being used to build a criteria for intrusion alert. The minimum time is determined after a predefined period for collecting traffic information, the predefined period being for example a few days (enough to get a substantive dataset of 50000 frames).

When the sensor is aperiodic sensor, i.e. a sensor sending operating data at aperiodic or variable time interval upon event, the collector module COL can implement a counter determining the number of data frames received during a defined time interval of usage. The time interval of usage can be defined after an observation period long enough to detect patterns of the behaviour of the sensor. For example, there can be different patterns corresponding to different behaviour of the sensor according to time or date: for each day of the week, the sensor may have a different behaviour, thus attributed a different pattern for the day, whereas during the night or the weekend the sensor may have another specific behaviour.

In one embodiment, the collector module COL can implement a counter for each hour of the day determining the total number of data frames received during the hour and determining the total number of data frames received during the day. For each day, the collector module COL can thus create a traffic pattern for a sensor that corresponds to the behavior of the sensor for sending data frames during the day.

In all cases for a sensor, the collector module COL creates a traffic pattern for the sensor, the traffic pattern being based on a periodic time intervals for sending two consecutive data frames by the wireless sensor when it is a periodic sensor or based on the number of frames received during a given time interval, that correspond to a specific period of use of the wireless sensor.

The log file created by the collector module COL can be enriched by other data in order to create a dataset able to train an algorithm for learning normal and abnormal behaviour of the sensors.

The learning module LEA is able to introduce simulations of traffic anomalies, like abnormal traffic or intrusions, in order to enrich the dataset with expected anomalies, for example by tagging each entry of the dataset with the expected output if it is an anomaly or not. The introduction of simulated anomalies can be used by a supervised random forest model in an efficient way: by giving the expected output for each data in the dataset, the algorithm trains a very accurate model. Advantageously, as the traffic anomalies are simulated, it is easy to tag as "suspected intrusion" or "abnormal traffic" for example.

In order to help the algorithm to train more accurately, traffic anomalies are simulated for each given pattern of a wireless sensor, for example in a form of a replay attack, where the frequency or number of the data frames sent by the wireless sensor is higher than the given pattern.

The random forest algorithm is trained with the dataset collected during the data collection phase in order to constitute a valid model. The collected dataset is shuffled and separated into two random datasets, a training dataset composed of most of the data, e.g. 80% of the data and a testing dataset for the remaining of the data, e.g. 20% of the data.

The learning module LEA defines different input parameters related to a wireless sensor to be used for the learning of the random forest algorithm. In one embodiment with periodic wireless sensor, the input parameters can be: the position of the wireless sensor in the switch memory, the type of the wireless sensor and the period between two consecutive frames sent by the wireless sensor. The output of the random forest algorithm is a detection of a traffic anomaly. In another embodiment with aperiodic wireless sensor, the input parameters can be: the position of the wireless sensor in the switch memory, the day of the week, if the wireless sensor is in operation that day, 24 inputs for a counter for each hour of the day and the total number of data frames received during the day. In this case, the sum of the 24 counters represent the pattern. In a general manner, the pattern is represented by the number of data frames received during a defined time interval of usage (here in the example 24 inputs for a counter for each hour of the day).

During a learning phase, the algorithm is trained with the training dataset and then tested for accuracy with the testing dataset, where both outputs are compared: the testing dataset shall contain a mix of traffic anomaly simulations to test for accuracy of the trained algorithm. A threshold is used to validate the model: for example a 95% rate of accuracy between the expected results and the trained algorithm is considered acceptable.

Once the machine learning model is validated, it can be used with the current data frames sent from the wireless sensors to the switch.

The detection module DET is able to read the state of the switch memory at a higher frequency than the highest-rate used by any wireless sensor, for example five times higher for accuracy and determinism. In one embodiment with periodic sensor, the detection module DET classifies the data collected by the switch by the position of the wireless sensor in the switch memory, the type of the wireless sensor and the periodic time interval between two consecutive data frames sent by the wireless sensor. In another embodiment with aperiodic sensor, the detection module DET classifies the data collected by the switch by the position of the wireless sensor in the switch memory and the number of data frames received during a defined time interval of usage.

During the detection phase, a criteria for detecting a traffic anomaly is an increase of the traffic by a wireless sensor, as learned with the simulated traffic anomalies during the learning phase.

With a periodic wireless sensor, a traffic anomaly can be detected when the wireless sensor sends two consecutive data frames in a time interval shorter than the periodic time interval defined in the pattern of the validated model.

With an aperiodic wireless sensor, a traffic anomaly can be detected when the wireless sensor sends data frames in a number of times during a time interval of usage than is higher than number defined in the pattern of the validated model.

The detection module DET creates two files: an operation file in which it stores normal traffic with values for the input parameters and an anomaly file in which it stores abnormal traffic with detected traffic anomalies in which it will log the previous and the next data from the suspicious data for reference. The anomaly file is kept up to date and security thresholds can be set based on the number of suspected traffic anomalies in order to a) trigger a system administrator alert and b) send a request to the switch for re-establishing a commissioning procedure, with a higher security level, and/or a channel change request (in case the payload is already encrypted, a channel change request could be an option to further mitigate an adversary intrusion and give more time to the system administrator to find the source of the suspected intrusion).

The security status can be updated automatically after detection of a traffic anomaly or a predefined number of traffic anomalies.

In one embodiment, the machine learning model is based on RANDOM FORESTS® models, or random decision forest models, utilizing state transition elements (STEs) of, for example, an automaton or automata processor. Indeed, in certain embodiments, the automata processor may translate tree-based ensemble models (e.g. RANDOM FORESTS®, or random decision forest model) from a tree-traversal algorithm memory-bound by decision tree depth to a pipelined design that computes thresholds independently from model computation. For example, the processor or the automata processor may implement and compute RANDOM FORESTS® models, or random decision forest models, by converting each of the path-to-leaves of decision trees into feature identification chains based on, for example, feature values, and, more specifically, a range of feature values. In certain embodiments, in lieu of utilizing floating point numbers and/or floating point operations to represent feature values, a processor may perform a labeling technique to represent floating point values to utilizing symbol-set and operations available on the automata processor. In some embodiments, each STE or automaton of the automata processor may be designed to process feature values in the same order.

An embodiment comprises a security device SD under the form of an apparatus comprising one or more processor(s), I/O interface(s), and a memory coupled to the processor(s). The processor(s) may be implemented as one or more microprocessors, microcomputers, microcontrollers, digital signal processors, central processing units, state machines, logic circuitries, and/or any devices that manipulate signals based on operational instructions. The processor(s) can be a single processing unit or a number of units, all of which could also include multiple computing units. Among other capabilities, the processor(s) are configured to fetch and execute computer-readable instructions stored in the memory.

The functions realized by the processor may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

The memory may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory includes modules and data. The modules include routines, programs, objects, components, data structures, etc., which perform particular tasks or implement particular abstract data types. The data, amongst other things, serves as a repository for storing data processed, received, and generated by one or more of the modules.

A person skilled in the art will readily recognize that steps of the methods, presented above, can be performed by programmed computers. Herein, some embodiments are also intended to cover program storage devices, for example, digital data storage media, which are machine or computer readable and encode machine-executable or computer-executable programs of instructions, where said instructions perform some or all of the steps of the described method. The program storage devices may be, for example, digital memories, magnetic storage media, such as a magnetic disks and magnetic tapes, hard drives, or optically readable digital data storage media.

Figure 2:
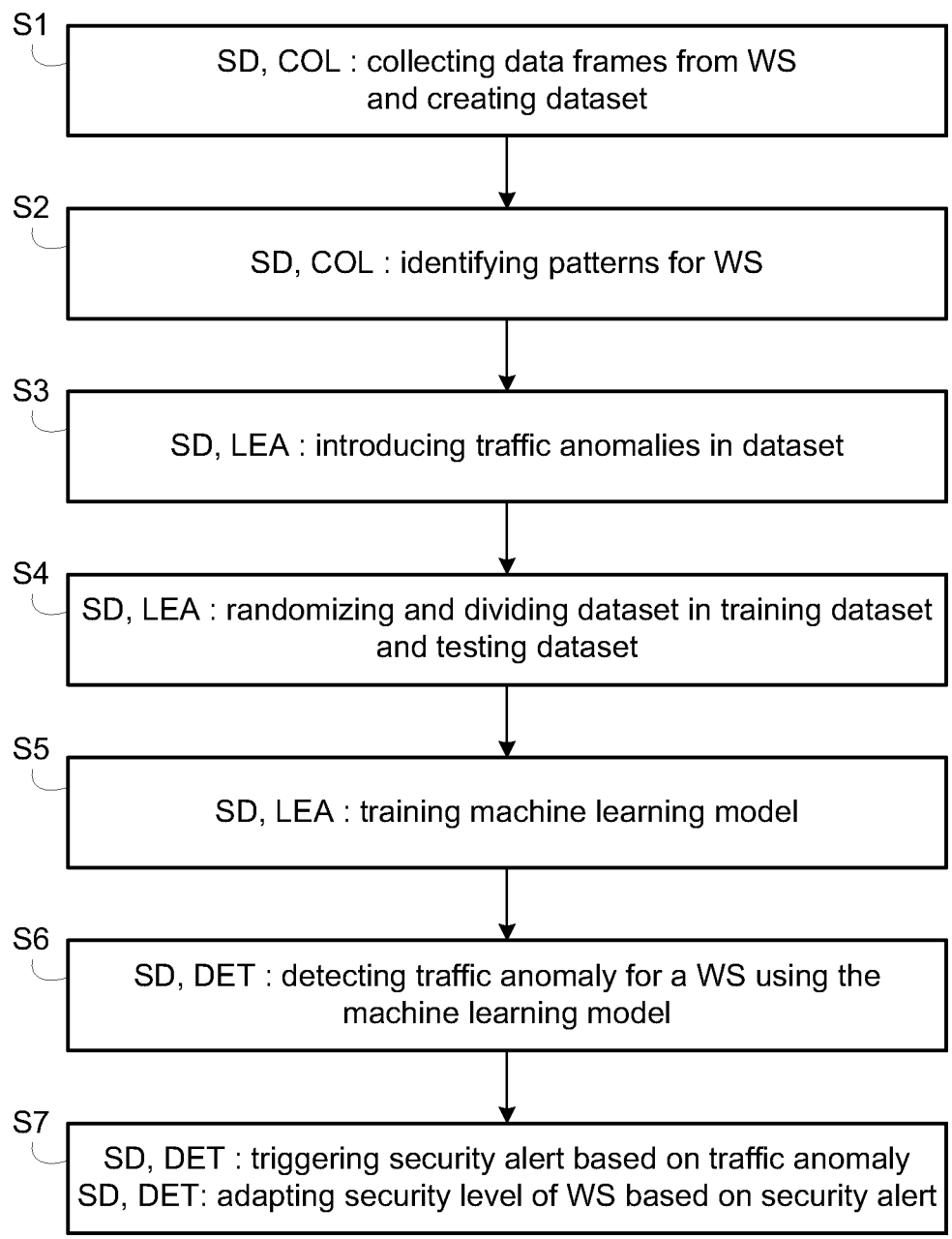
FIG. 2 shows a flow chart illustrating a method for adapting the level of security of wireless sensors according to one embodiment of the invention.

With reference to FIG. 2, a method for setting a security level of wireless sensors communicating with a switch according to one embodiment of the invention comprises steps S1 to S7. The wireless sensors are supplied by internal battery and are set with a given security level.

In step S1, the wireless sensors send data frames to the switch. The collector module COL collects data frames sent from the wireless sensors to the switch, for example by interrogating the memory of the switch or by receiving a report from the switch. The collector module COL creates a dataset containing the collected data frames.

In step S2, the collector module COL analyses the collected data frames to identify patterns for wireless sensors sending data frames. The collector module COL distinguishes periodic wireless sensors (e.g. sending data frames at periodic time interval) from aperiodic wireless sensors (e.g. sending data frames upon events), by extracting the identifier of the wireless sensor from the data frame. Each pattern is associated with a wireless sensor and is based on a periodic time interval for sending two consecutive data frames if the wireless sensor is a periodic wireless sensor or is based on the number of data frames received during a given time interval frames if the wireless sensor is an aperiodic wireless sensor.

In one embodiment, the dataset is considered complete once a sufficient number of data frames has been collected to identify all the possible patterns.

In step S3, the learning module LEA introduces simulated traffic anomalies in the dataset with respect to the traffic patterns. Per nature, a traffic anomaly for a given wireless sensor deviates from the pattern associated with said given wireless sensor. For each pattern, one or more traffic anomalies can be defined. For example, a traffic anomaly corresponds to a frequency or number of data frames sent by the wireless sensor higher than the traffic pattern associated with said wireless sensor.

Once the simulated traffic anomalies have been added to the dataset, this latter becomes an enriched dataset having a content composed of data as data frames and traffic anomalies, the enriched dataset being ready to be used by a machine learning algorithm relying on the identified patterns.

In one embodiment, some simulated traffic anomalies can be introduced during the collection phase, especially for periodic wireless sensors, as their periods to send data frames may be known in advance.

In step S4, the learning module LEA randomizes the dataset, for example by shuffling the content of the enriched dataset, i.e. the collected data frames and the simulated traffic anomalies. Then the learning module LEA divides the randomized dataset in a training dataset and in a testing dataset, wherein the training dataset contains more data of the dataset than the testing dataset. For example, the training dataset contains a large majority of the data, e.g. 80% of the enriched dataset, whereas the testing dataset contains the remaining data, e.g. 20% of the enriched dataset.

In step S5, the learning module LEA trains a machine learning model configured for detecting traffic anomalies, by using the training dataset. For example, the machine learning model is based on a supervised random forest model. The trained machine learning model is tested with the testing dataset, by comparing the outputs obtained from the training dataset and from the testing dataset.

The learning module LEA validates the machine learning model if the trained machine learning model reaches a threshold of accuracy with the testing dataset, for example a 95% rate of accuracy between the expected outputs from the testing dataset and the outputs from the training dataset.

In step S6, the wireless sensors are in operation and send data frames to the switch. The detection module DET analyses said data frames retrieved from the switch. The detection module DET can detect a traffic anomaly in the data frames of a wireless sensor by using the validated machine learning model. The validated machine learning model outputs a traffic anomaly for a data frame of a wireless sensor when the input parameters of the data frame induce a traffic anomaly.

In step S7, the detection module DET triggers a security alert based on the detected traffic anomaly. In one embodiment, the detection module DET stores and updates a traffic anomaly file listing the data frames identified as traffic anomalies.

In one embodiment, the detection module DET triggers a security alert if a given number of traffic anomalies has been detected.

The detection module DET adapts a security level of at least the wireless sensor based on the triggered security alert corresponding to the data frame sent by the wireless sensor. In other embodiments, the detection module DET adapts a security level for wireless sensors of the same type as the wireless sensor or for all the wireless sensors based on the triggered security alert.

Although the present invention has been described above with reference to specific embodiments, it is not intended to be limited to the specific form set forth herein. Rather, the invention is limited only by the accompanying claims and, other embodiments than the specific above are equally possible within the scope of these appended claims.

Furthermore, although exemplary embodiments have been described above in some exemplary combination of components and/or functions, it should be appreciated that, alternative embodiments may be provided by different combinations of members and/or functions without departing from the scope of the present disclosure. In addition, it is specifically contemplated that a particular feature described, either individually or as part of an embodiment, can be combined with other individually described features, or parts of other embodiments

The invention claimed is:

1. A method for setting a security level of wireless sensors communicating with a switch, the method comprising in a security device linked to the switch:
   collecting data frames sent from the wireless sensors to the switch and creating a dataset containing the collected data frames,
   identifying patterns associated with the wireless sensors from the collected data frames, each pattern being based on a periodic time interval for sending two consecutive data frames by a wireless sensor or based on a number of data frames sent by a wireless sensor during a time interval of usage,
   introducing simulated traffic anomalies in the dataset with respect to the traffic patterns,
   randomizing the dataset and dividing the randomized dataset in a training dataset and in a testing dataset, wherein the training dataset contains more data frames than the testing dataset,
   training, by using the training dataset, a machine learning model configured for detecting traffic anomalies, and validating the machine learning model if the trained machine learning model reaches a threshold of accuracy with the testing dataset,
   detecting a traffic anomaly for a given wireless sensor during operation of the wireless sensors by analyzing current data frames sent from the wireless sensors to the switch and by using the validated machine learning model,
   triggering a security alert based on the detected traffic anomaly, and adapting a security level for at least the given wireless sensor based on the triggered security alert.

2. The method according to claim 1, wherein the wireless sensors are supplied by internal battery.

3. The method according to claim 1, wherein a traffic anomaly for a given wireless sensor corresponds to a frequency or number of data frames sent by the wireless sensor higher than the traffic pattern associated with said given wireless sensor.

4. The method according to claim 1, wherein a pattern associated with a wireless sensor is based on a periodic time interval for sending two consecutive data frames by the wireless sensor when said wireless sensor is a periodic wireless sensor sending operating data at periodic time intervals.

5. The method according to claim 1, wherein a pattern associated with a wireless sensor is based on a number of data frames sent by a wireless sensor during a time interval of usage when said wireless sensor is an aperiodic wireless sensor sending operating data upon events.

6. The method according to claim 1, wherein the security level is adapted for wireless sensors of the same type as the given wireless sensor or for all the wireless sensors based on the triggered security alert.

7. The method according to claim 1, wherein a traffic anomaly is detected for a given wireless sensor when a data frame sent by the given wireless sensor corresponds to an increase of traffic with respect to the pattern associated with the given wireless sensor.

8. The method according to claim 1, wherein the machine learning model is based on a supervised random forest model.

9. A security device for setting a security level of wireless sensors communicating with a switch, the security device being linked to the switch and comprising:
means for collecting data frames sent from the wireless sensors to the switch and creating a dataset containing the collected data frames,
means for identifying patterns associated with the wireless sensors from the collected data frames, each pattern being based on a periodic time interval for sending two consecutive data frames by a wireless sensor or based on a number of data frames sent by a wireless sensor during a time interval of usage,
means for introducing simulated traffic anomalies in the dataset with respect to the traffic patterns,
means for randomizing the dataset and dividing the randomized dataset in a training dataset and in a testing dataset, wherein the training dataset contains more data frames than the testing dataset,
means for training, by using the training dataset, a machine learning model configured for detecting traffic anomalies, and validating the machine learning model if the trained machine learning model reaches a threshold of accuracy with the testing dataset,
means for detecting a traffic anomaly for a given wireless sensor during operation of the wireless sensors by analyzing current data frames sent from the wireless sensors to the switch and by using the validated machine learning model,
means for triggering a security alert based on the detected traffic anomaly, and
means for adapting a security level for at least the given wireless sensor based on the triggered security alert.

10. A non-transitory computer-readable medium having embodied thereon a computer program for executing the method for setting a security level of wireless sensors communicating with a switch according to claim 1.

11. A security device for setting a security level of wireless sensors communicating with a switch, the security device being linked to the switch and comprising:
at least one processor; and
at least one memory including computer program instructions, the at least one memory and the computer program instructions configured to, with the at least one processor, cause the security device to perform:
collecting data frames sent from the wireless sensors to the switch and creating a dataset containing the collected data frames,
identifying patterns associated with the wireless sensors from the collected data frames, each pattern being based on a periodic time interval for sending two consecutive data frames by a wireless sensor or based on a number of data frames sent by a wireless sensor during a time interval of usage,
introducing simulated traffic anomalies in the dataset with respect to the traffic patterns,
randomizing the dataset and dividing the randomized dataset in a training dataset and in a testing dataset, wherein the training dataset contains more data frames than the testing dataset,
training, by using the training dataset, a machine learning model configured for detecting traffic anomalies, and validating the machine learning model if the trained machine learning model reaches a threshold of accuracy with the testing dataset,
detecting a traffic anomaly for a given wireless sensor during operation of the wireless sensors by analyzing current data frames sent from the wireless sensors to the switch and by using the validated machine learning model,
triggering a security alert based on the detected traffic anomaly, and
adapting a security level for at least the given wireless sensor based on the triggered security alert.

* * * * *